US008594995B2

(12) United States Patent
Bodin et al.

(10) Patent No.: US 8,594,995 B2
(45) Date of Patent: Nov. 26, 2013

(54) MULTILINGUAL ASYNCHRONOUS COMMUNICATIONS OF SPEECH MESSAGES RECORDED IN DIGITAL MEDIA FILES

(75) Inventors: William K. Bodin, Austin, TX (US); David Jaramillo, Lake Worth, FL (US); Ann Marie G. Maynard, Austin, TX (US)

(73) Assignee: Nuance Communications, Inc., Burlington, MA (US)

( * ) Notice: Subject to any disclaimer, the term of this patent is extended or adjusted under 35 U.S.C. 154(b) by 985 days.

(21) Appl. No.: 12/108,726

(22) Filed: Apr. 24, 2008

(65) Prior Publication Data
US 2009/0271178 A1  Oct. 29, 2009

(51) Int. Cl.
*G06F 17/20* (2006.01)

(52) U.S. Cl.
USPC .............................................................. 704/8

(58) Field of Classification Search
USPC .............................................................. 704/8
See application file for complete search history.

(56) References Cited

U.S. PATENT DOCUMENTS

| | | | |
|---|---|---|---|
| 6,161,082 A * | 12/2000 | Goldberg et al. | 704/3 |
| 6,339,754 B1 * | 1/2002 | Flanagan et al. | 704/2 |
| 6,665,642 B2 * | 12/2003 | Kanevsky et al. | 704/260 |
| 6,993,474 B2 | 1/2006 | Curry et al. | |
| 7,219,136 B1 * | 5/2007 | Danner et al. | 709/219 |
| 2001/0029455 A1 * | 10/2001 | Chin et al. | 704/277 |
| 2003/0163300 A1 * | 8/2003 | Kasvand et al. | 704/2 |
| 2004/0006560 A1 * | 1/2004 | Chan et al. | 707/3 |
| 2004/0102957 A1 * | 5/2004 | Levin | 704/3 |
| 2004/0128136 A1 * | 7/2004 | Irani | 704/270.1 |
| 2006/0271352 A1 * | 11/2006 | Nikitin et al. | 704/9 |
| 2007/0208687 A1 * | 9/2007 | O'Conor et al. | 707/1 |
| 2007/0288488 A1 * | 12/2007 | Rohrs et al. | 707/100 |
| 2008/0004858 A1 | 1/2008 | Gao et al. | |
| 2008/0162472 A1 * | 7/2008 | Cheng et al. | 707/6 |
| 2008/0300852 A1 * | 12/2008 | Johnson et al. | 704/2 |
| 2009/0006342 A1 * | 1/2009 | Wong et al. | 707/4 |
| 2009/0112575 A1 * | 4/2009 | Sakashita et al. | 704/8 |
| 2009/0306957 A1 * | 12/2009 | Gao et al. | 704/2 |

FOREIGN PATENT DOCUMENTS

| | | | |
|---|---|---|---|
| KR | 10-2000-0072108 A | 12/2000 | |
| KR | 10-2001-0008073 A | 2/2001 | |

OTHER PUBLICATIONS

International Search Report and Written Opinion for International Application No. PCT/US2009/002549 mailed Dec. 29, 2009.

* cited by examiner

*Primary Examiner* — Jakieda Jackson
(74) *Attorney, Agent, or Firm* — Wolf, Greenfield & Sacks, P.C.

(57) ABSTRACT

Methods, systems, and computer program products are provided multilingual for asynchronous communications. Embodiments include recording a speech message in a digital media file; transmitting, from a sender multilingual communications application to a recipient multilingual communications application, the speech message in the digital media file; receiving, in the recipient multilingual communications application, the recorded speech message in the digital media file; converting, by the recipient multilingual communications application, the recorded speech message to text; identifying, by the recipient multilingual communications application, that the text of the recorded speech message is in a source language that is not a predetermined target language; translating, by the recipient multilingual communications application, the text in the source language to translated text in the target language; converting, by the recipient multilingual communications application, the translated text to synthesized speech in the target language; recording, by the recipient multilingual communications application, the synthesized speech in the target language in a digital media file; and playing the media file thereby rendering the synthesized speech.

20 Claims, 4 Drawing Sheets

MULTILINGUAL ASYNCHRONOUS COMMUNICATIONS OF SPEECH MESSAGES RECORDED IN DIGITAL MEDIA FILES

BACKGROUND OF THE INVENTION

1. Field of the Invention

The field of the invention is data processing, or, more specifically, methods, systems, and products for multilingual asynchronous communications.

2. Description of Related Art

Managers are increasingly isolated from one another and their employees. One reason for this isolation is that managers are often time constrained and their communication occurs with many different devices and often communications requires two or more managers or employees to be available at the same time. Furthermore, more and more of today's managers or employees work in different countries. This business landscape is complex considering that the vast majority of the world's population needs or prefers a language other than English to carry out business functions. As international trade and cultural exchange continues to grow, the need for multilingual support for communications among users will also continue to grow. There therefore is a need for improvement in multilingual communications among users.

SUMMARY OF THE INVENTION

Methods, systems, and computer program products are provided multilingual for asynchronous communications. Embodiments include recording a speech message in a digital media file; transmitting, from a sender multilingual communications application to a recipient multilingual communications application, the speech message in the digital media file; receiving, in the recipient multilingual communications application, the recorded speech message in the digital media file; converting, by the recipient multilingual communications application, the recorded speech message to text; identifying, by the recipient multilingual communications application, that the text of the recorded speech message is in a source language that is not a predetermined target language; translating, by the recipient multilingual communications application, the text in the source language to translated text in the target language; converting, by the recipient multilingual communications application, the translated text to synthesized speech in the target language; recording, by the recipient multilingual communications application, the synthesized speech in the target language in a digital media file; and playing the media file thereby rendering the synthesized speech.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
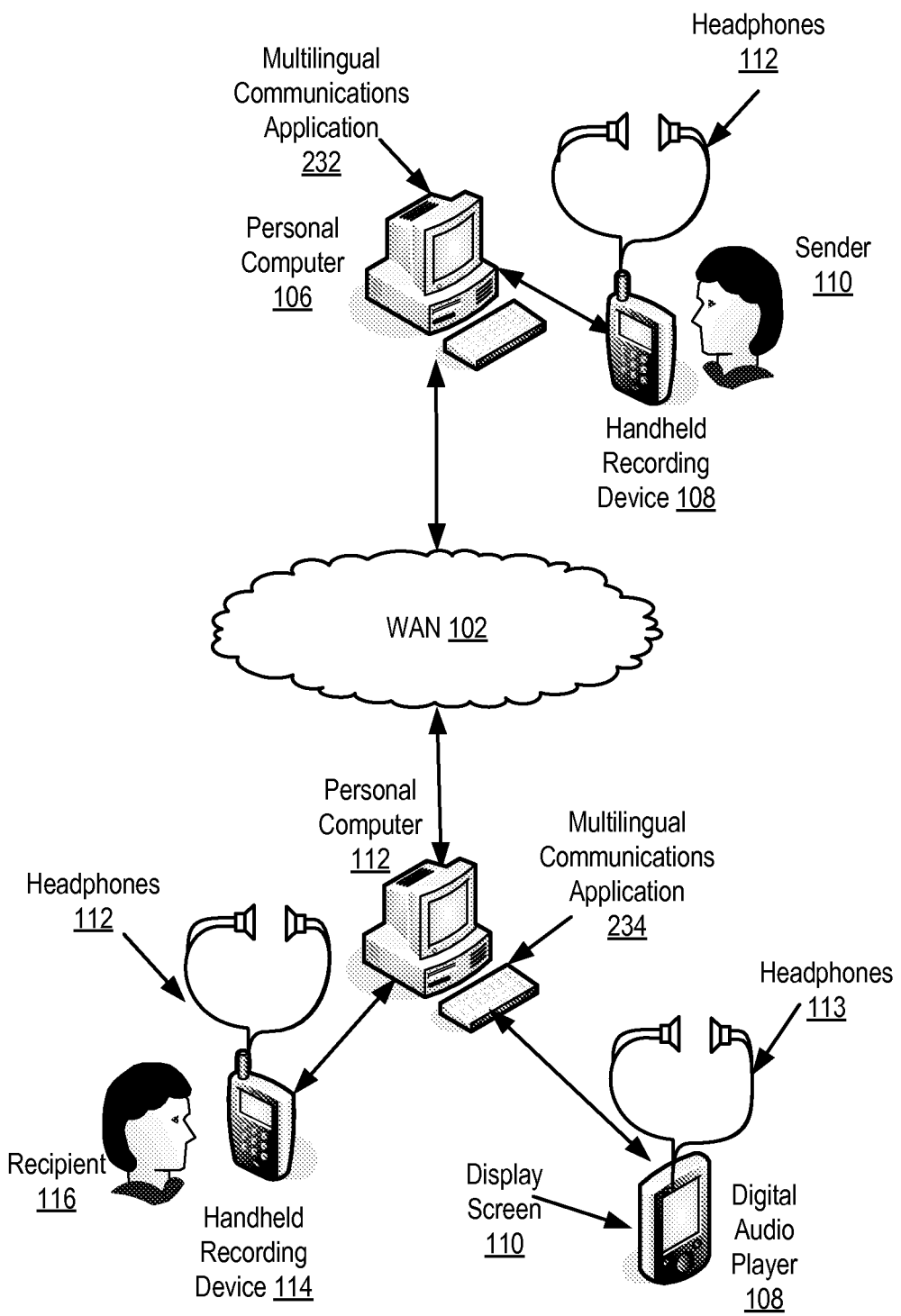
FIG. 1 sets forth a network diagram of a system for multilingual asynchronous communications according to embodiments of the present invention.

Example methods, systems, and products for multilingual asynchronous communications in accordance with the present invention are described with reference to the accompanying drawings, beginning with FIG. 1. FIG. 1 sets forth a network diagram of a system for multilingual asynchronous communications according to embodiments of the present invention. Multilingual asynchronous communications allows communications among parties that occurs with some time delay and includes translation from a source language to a target language. Multilingual asynchronous communications according to the present invention allows participants of communications to send, receive, and respond to communications at their own convenience with no requirement to be available simultaneously and no requirement that the sender and the recipient of the message speak the same language.

The system of FIG. 1 includes two personal computers (106 and 112) coupled for data communications to a wide area network ('WAN') (102). Each of the personal computers (106 and 112) of FIG. 1 have installed upon them a multilingual communications application (232 and 234). A multilingual communications application includes computer program instructions capable of receiving a recorded speech message in a digital media file transmitted from another multilingual communications application; converting the recorded speech message to text; identifying that the text of the recorded speech message is in a source language that is not a predetermined target language; translating the text in the source language to translated text in the target language; converting the translated text to synthesized speech in the target language; and recording the synthesized speech in the target language in a digital media file.

The example system of FIG. 1 is capable of asynchronous communications according to the present invention by recording a speech message from a sender (110). In the example of FIG. 1, the speech message is recorded using a handheld recording device (108). The handheld recording device includes a microphone for receiving the sender's speech of the message and is capable of recording the message in a digital media file. Examples of handheld recording devices useful in multilingual asynchronous communications according to the present invention include the WP-U2J available from Samsung, the Digital Pocket Memo available from Phillips, the Professional Digital Recorder from Olympus, and others as will occur to those of sill in the art.

The example system of FIG. 1 is capable of transferring the media file containing the recorded message from the handheld recording device (108) to a multilingual communications application (232). Media files containing one or more messages may be transferred to the multilingual communications application by periodically synchronizing the handheld recording device with the multilingual communications application allowing a sender to begin transmission of the message at the convenience of the sender.

The example system of FIG. 1 is also capable of transmitting, from a sender multilingual communications application (232) to a recipient multilingual communications application (234), the speech message (304) in the digital media file (306). The recipient multilingual communications application (234) of FIG. 1 is capable of receiving the recorded speech message in the digital media file; converting the recorded speech message to text; identifying that the text of the recorded speech message is in a source language that is not a predetermined target language; translating the text in the source language to translated text in the target language; converting the translated text to synthesized speech in the target language; and recording the synthesized speech in the target language in a digital media file.

The example system of FIG. 1 is also capable of playing the media file thereby rendering the synthesized speech. In the example of FIG. 1 the media file may be played by storing the media file on a digital audio player (108) and playing the media file on the digital audio player. Examples of digital audio players include the iPod™ from Apple and Creative Zen Vision from Creative labs.

In the example system of FIG. 1, the recipient (116) is also capable of recording a speech response message in the target language (330). The recorded speech response may include the recipient's (116) speech recorded on a digital audio recorder (114) in a manner similar to the recording of the speech message by the sender (110).

The example system of FIG. 1 is also capable of transmitting, from the recipient multilingual communications application (234) to a sender multilingual communications application (232), the speech response message in the target language. The speech response message in the target language may then be translated by the multilingual communications application (232) on the sender's computer (106). Alternatively, the speech response may be converted to text, translated to the source language, and synthesized speech may be created from the translated text in the source language using the multilingual communications application (234) on the recipient's personal computer. In such cases, a digital media file containing the synthesized speech of the response in the target language may be sent to the sender (110) for rendering in the source language.

The arrangement of devices making up the example system illustrated in FIG. 1 is for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Multilingual asynchronous communications in accordance with the present invention is generally implemented with computers, that is, with automated computing machinery. In the system of FIG. 1, for example, all the nodes, servers, and communications devices are implemented to some extent at least as computers. For further explanation, therefore, FIG. 2 sets forth a block diagram of automated computing machinery comprising a personal computer (112) useful in multilingual asynchronous communications according to embodiments of the present invention. The computer (112) of FIG. 2 includes at least one computer processor (156) or 'CPU' as well as random access memory (168) ('RAM') which is connected through a system bus (160) to processor (156) and to other components of the library management system.

Stored in RAM (168) is a multilingual communications application (234) according to the present invention including computer program instructions for transmitting a speech message in the digital media file; receiving the recorded speech message in the digital media file; converting the recorded speech message to text; identifying that the text of the recorded speech message is in a source language that is not a predetermined target language; translating the text in the source language to translated text in the target language; converting the translated text to synthesized speech in the target language; and recording the synthesized speech in the target language in a digital media file.

Figure 2:
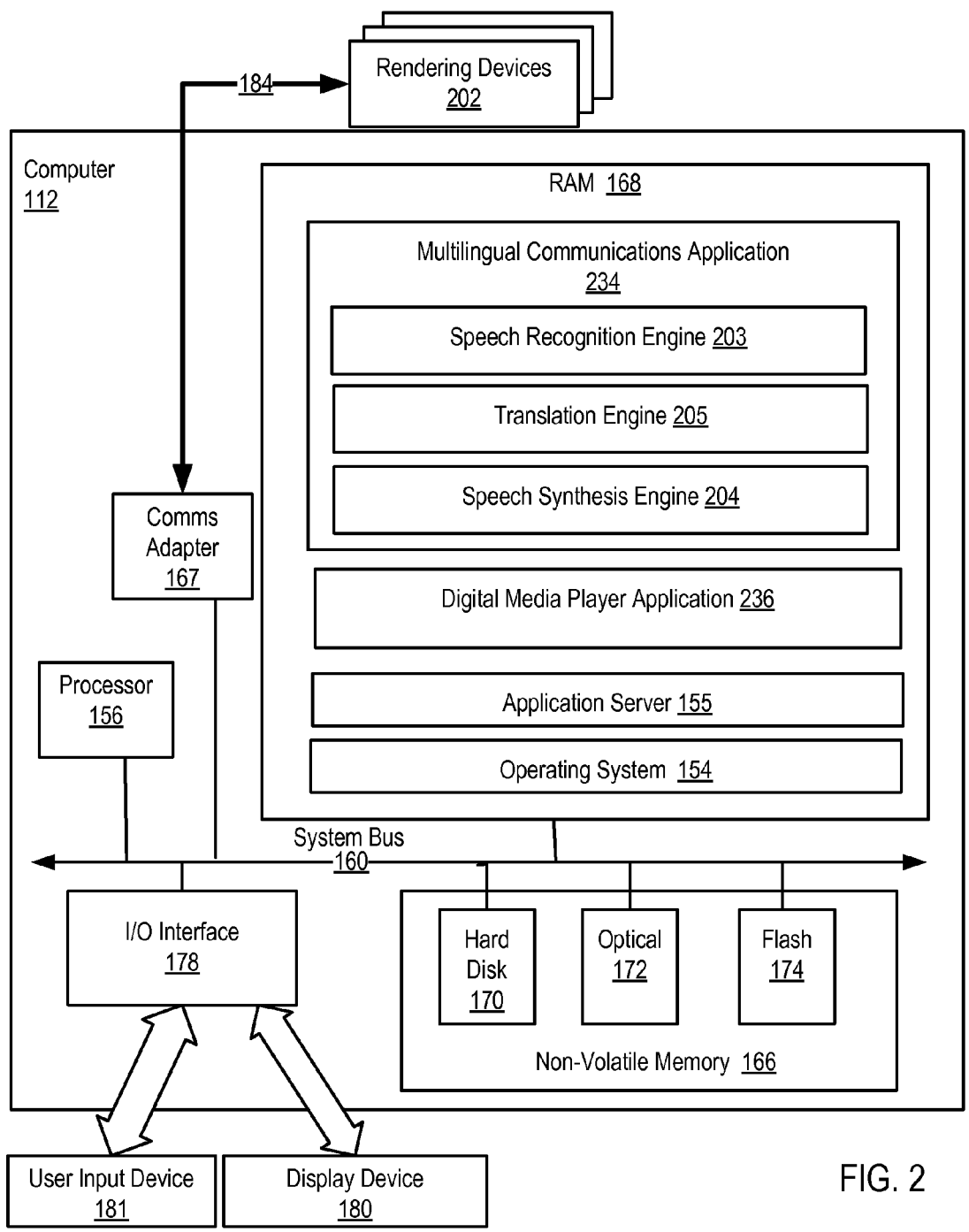
FIG. 2 sets forth a block diagram of automated computing machinery comprising an example multilingual communications application according to embodiments of the present invention.

The multilingual communications application (234) of FIG. 2 includes a speech recognition engine (203), computer program instructions for converting a recorded message to text. Examples of speech recognition engines capable of modification for use with a multilingual communications applications according to the present invention include SpeechWorks available from Nuance Communications, Dragon NaturallySpeaking also available from Nuance Communications, ViaVoice available from IBM®, Speech Magic available from Philips Speech Recognition Systems, iListen from MacSpeech, Inc., and others as will occur to those of skill in the art.

The multilingual communications application (234) of FIG. 2 includes a translation engine (205). The translation engine of FIG. 2 include computer program instructions for translating the text in the source language to translated text in the target language. Examples of translation engines include alphaworks available from IBM®, translation engines by Ectaco, Inc, and others as will occur to those of skill in the art.

The multilingual communications application (234) of FIG. 2 includes a speech synthesis engine (204), computer program instructions for creating synthesized speech. Examples of speech engines capable of creating speech identifying the content associated with the message, for example, IBM's ViaVoice Text-to-Speech, Acapela Multimedia TTS, AT&T Natural Voices™ Text-to-Speech Engine, and Python's pyTTS class.

Figure 3:
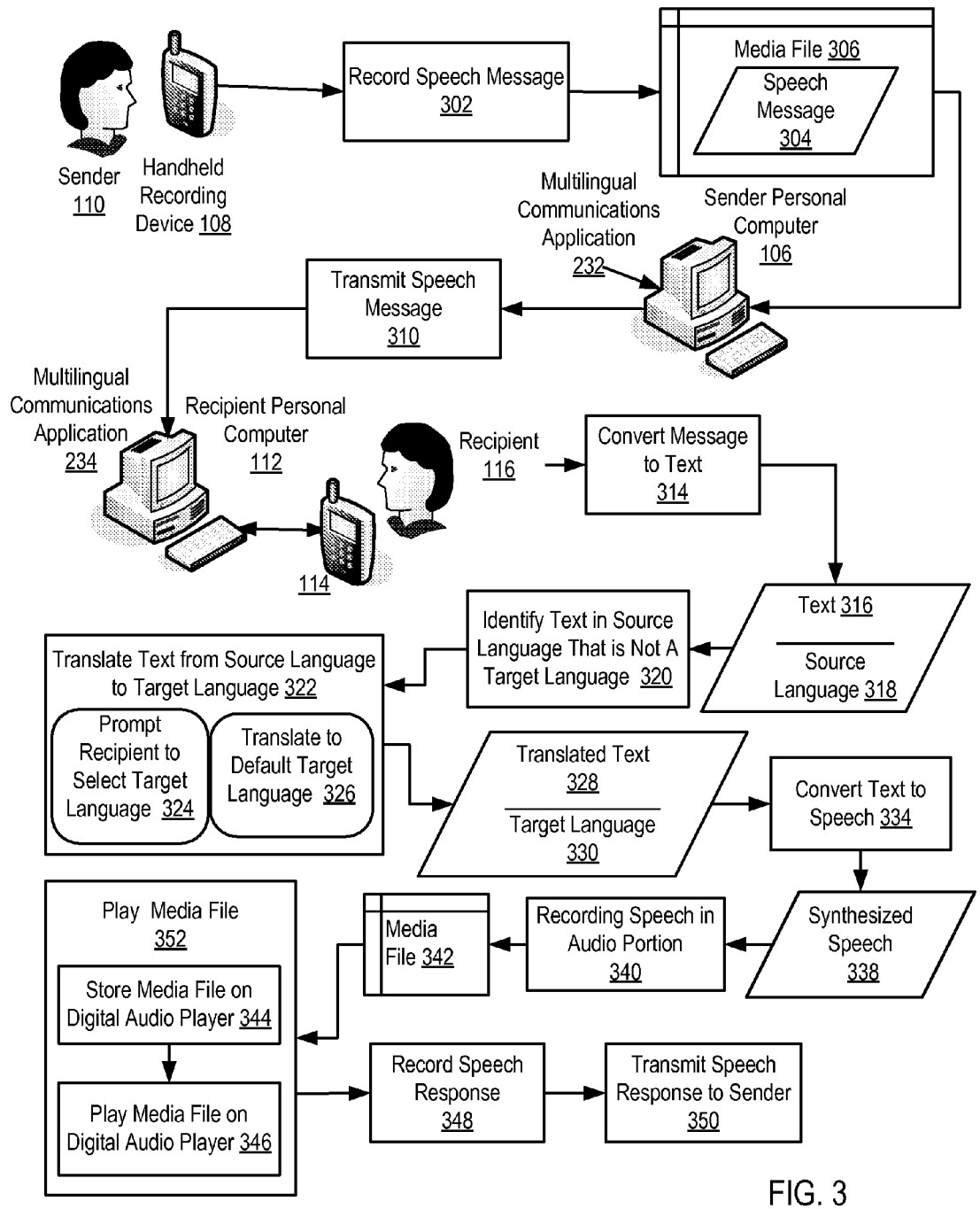
FIG. 3 sets forth a flow chart illustrating an example method for multilingual asynchronous communications according to embodiments of the present invention.

Also stored in RAM (168) is a digital media player application (236). A digital media player application (236) is an application that manages media content such as audio files and video files. Such digital media player applications are typically capable of transferring media files to a portable media player and playing those media files. Examples of digital media player applications include Music Match™, iTunes®, and others as will occur to those of skill in the art. The digital media player application (236) of FIG. 3 is capable of storing the media file on a digital audio player and playing the media file thereby rendering the synthesized speech.

Also stored in RAM (168) is an operating system (154). Operating systems useful in computers according to embodiments of the present invention include UNIX™, Linux™, Microsoft XP™, AIX™, IBM's i5/OS™, and others as will occur to those of skill in the art. Operating system (154) and multilingual communications application (234) in the example of FIG. 2 are shown in RAM (168), but many components of such software typically are stored in non-volatile memory (166) also.

The computer (112) of FIG. 2 includes non-volatile computer memory (166) coupled through a system bus (160) to processor (156) and to other components of the computer.

Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer (112) of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The example computer (112) of FIG. 2 includes a communications adapter (167) for implementing data communications (184) with other computers (182). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for multi-lingual asynchronous communications according to embodiments of the present invention include modems for wired dial-up communications, Ethernet (IEEE 802.3) adapters for wired network communications, and 802.11b adapters for wireless network communications.

For further explanation, FIG. 3 sets forth a flow chart illustrating an example method for multilingual asynchronous communications according to embodiments of the present invention. The method of FIG. 3 includes recording (302) a speech message (304) in a digital media file (306). In the example of FIG. 3 a sender (110) records a speech message on a handheld recording device (108) in a media file (306) of the data format supported by the handheld recording device (108). Examples of media files useful in asynchronous communications according to the present invention include MPEG 3 ('.mp3') files, MPEG 4 ('.mp4') files, Advanced Audio Coding ('AAC') compressed files, Advances Streaming Format ('ASF') Files, WAV files, and many others as will occur to those of skill in the art.

In the method of FIG. 3, the recorded speech message (304) includes a user's (110) speech recorded on a digital audio recorder (108). Examples of handheld recording devices useful in multilingual asynchronous communications according to the present invention include WP-U2J available from Samsung, the Digital Pocket Memo available from Phillips, the Professional Digital Recorder from Olympus, and others as will occur to those of sill in the art.

The method of FIG. 3 also includes transmitting (310), from a sender multilingual communications application (232) to a recipient multilingual communications application (234), the speech message (304) in the digital media file (306). Transmitting (310) the speech message (304) in the digital media file (306) according to the method of FIG. 3 includes transferring the media file (306) to a multilingual communications application on a sender's computer (106) and sending the media file (306) to a recipients multilingual communications application (234) on the recipient's computer (112) using a data communications protocol, such as, for example, TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art.

The method of FIG. 3 also includes converting (314), by the recipient multilingual communications application (234), the recorded speech message (304) to text (316). Converting (314), by the recipient multilingual communications application (234), the recorded speech message (304) to text (316) may be carried out by a speech recognition engine. Speech recognition is the process of converting a speech signal to a set of words, by means of an algorithm implemented as a computer program. Different types of speech recognition engines currently exist. Isolated-word speech recognition systems, for example, require the speaker to pause briefly between words, whereas a continuous speech recognition systems do not. Furthermore, some speech recognition systems require a user to provide samples of his or her own speech before using them, whereas other systems are said to be speaker-independent and do not require a user to provide samples.

To accommodate larger vocabularies, speech recognition engines use language models or artificial grammars to restrict the combination of words and increase accuracy. The simplest language model can be specified as a finite-state network, where the permissible words following each word are explicitly given. More general language models approximating natural language are specified in terms of a context-sensitive grammar.

Examples of commercial speech recognition engines currently available include SpeechWorks available from Nuance Communications, Dragon NaturallySpeaking also available from Nuance Communications, ViaVoice available from IBM®, Speech Magic available from Philips Speech Recognition Systems, iListen from MacSpeech, Inc., and others as will occur to those of skill in the art. The method of FIG. 3 also includes identifying (320), by the recipient multilingual communications application (234), that the text (316) of the recorded speech message is in a source language (318) that is not a predetermined target language. A predetermined target language is one or more languages previously designated by a user as acceptable target languages for rendering asynchronous communications.

Identifying (320) that the text (316) of the recorded speech message is in a source language (318) that is not a predetermined target language may be carried out using a language identification tool. Examples of such language identification tools include TextCat Language Guesser an online tool implemented in Perl, XRCE MLTT Language Identifier from Xerox, the AppliedLanguage language identifier, and many others as will occur to those of skill in the art.

The method of FIG. 3 also includes translating (322), by the recipient multilingual communications application (234), the text (316) in the source language (318) to translated text (328) in the target language (330). Translating (322) the text (316) in the source language (318) to translated text (328) in the target language (330) is typically carried out by machine translation. Machine translation is a sub-field of computational linguistics that investigates the use of computer software to translate text or speech from one natural language to another. Machine translation performs substitution of words in one natural language for words in another. Using a corpus techniques, more complex translations may be attempted, allowing for better handling of differences in linguistic typology, phrase recognition, and translation of idioms, as well as the isolation of anomalies. Current machine translation software often allows for customization by domain or profession thereby improving the quality of the translation by limiting the scope of allowable substitutions of words or phrases. This technique is particularly effective in domains where formal or formulaic language is used.

The translation process often includes the steps of decoding the meaning of the source text and then re-encoding this meaning in the target language. To decode the meaning of the source text in its entirety, the machine translation engine must interpret and analyze all the features of the text, a process that requires information regarding the grammar, semantics, syntax, idioms, etc., of the source language, as well as the culture of its speakers. The machine translation engine needs the same in-depth knowledge to re-encode the meaning in the target language.

Machine translation engines often employ linguistic rules. Generally, rule-based methods parse text, usually creating an intermediary, symbolic representation, from which the text in the target language is generated. According to the nature of the intermediary representation, an approach is described as interlingual machine translation or transfer-based machine translation. These methods require extensive lexicons with morphological, syntactic, and semantic information, and large sets of rules. Interlingual machine translation is one instance of rule-based machine translation. According to this approach, the source language is transformed into a language-independent representation. The target language is then generated from the language-independent representation.

Machine translation engines may also employ a method based on dictionary entries. In such methods, the words are translated as a dictionary does—word by word, usually without much correlation of meaning between them. Dictionary lookups may be done with or without further. While this approach to machine translation is probably the least sophisticated, dictionary-based machine translation is ideally suitable for the translation of long lists of phrases such as inventories or simple catalogs of products and services.

The method of FIG. 3 includes two alternative methods of initiating the translation of the text (316) in the source language (318) to translated text (328) in the target language (330). On way of translating (322) the text (316) in the source language (318) to translated text (328) in the target language (330) according to the method of FIG. 3 includes prompting (324) a user to select a target language. Prompting (324) a user to select a target language may be carried out by use of graphical user interface ('GUI') pop-up as described below with reference to FIG. 4.

Translating (322) the text (316) in the source language (318) to translated text (328) in the target language (330) according to the method of FIG. 3 may alternatively include translating (326) the text in the source language to translated text in a default target language. A default target language is a predetermined target language for translation in multilingual asynchronous communications according to the method of FIG. 3. A default target language facilitates translation without requiring user intervention.

The method of FIG. 3 also includes converting (334), by the recipient multilingual communications application (234), the translated text (328) to synthesized speech (338) in the target language. Converting (334) the translated text (328) to synthesized speech (338) in the target language may be carried out by processing the text using a text-to-speech engine in order to produce a speech presentation of the translated text. Examples of speech engines capable of converting extracted text to speech for recording in the audio portion of a media filed include, for example, IBM's ViaVoice Text-to-Speech, Acapela Multimedia TTS, AT&T Natural Voices™ Text-to-Speech Engine, and Python's pyTTS class. Each of these text-to-speech engines is composed of a front end that takes input in the form of text and outputs a symbolic linguistic representation to a back end that outputs the received symbolic linguistic representation as a speech waveform.

Typically, speech synthesis engines operate by using one or more of the following categories of speech synthesis: articulatory synthesis, formant synthesis, and concatenative synthesis. Articulatory synthesis uses computational biomechanical models of speech production, such as models for the glottis and the moving vocal tract. Typically, an articulatory synthesizer is controlled by simulated representations of muscle actions of the human articulators, such as the tongue, the lips, and the glottis. Computational biomechanical models of speech production solve time-dependent, 3-dimensional differential equations to compute the synthetic speech output. Typically, articulatory synthesis has very high computational requirements, and has lower results in terms of natural-sounding fluent speech than the other two methods discussed below.

Formant synthesis uses a set of rules for controlling a highly simplified source-filter model that assumes that the glottal source is completely independent from a filter which represents the vocal tract. The filter that represents the vocal tract is determined by control parameters such as formant frequencies and bandwidths. Each formant is associated with a particular resonance, or peak in the filter characteristic, of the vocal tract. The glottal source generates either stylized glottal pulses for periodic sounds and generates noise for aspiration. Formant synthesis generates highly intelligible, but not completely natural sounding speech. However, formant synthesis has a low memory footprint and only moderate computational requirements.

Concatenative synthesis uses actual snippets of recorded speech that are cut from recordings and stored in an inventory or voice database, either as waveforms or as encoded speech. These snippets make up the elementary speech segments such as, for example, phones and diphones. Phones are composed of a vowel or a consonant, whereas diphones are composed of phone-to-phone transitions that encompass the second half of one phone plus the first half of the next phone. Some concatenative synthesizers use so-called demi-syllables, in effect applying the diphone method to the time scale of syllables. Concatenative synthesis then strings together, or concatenates, elementary speech segments selected from the voice database, and, after optional decoding, outputs the resulting speech signal. Because concatenative systems use snippets of recorded speech, they have the highest potential for sounding like natural speech, but concatenative systems require large amounts of database storage for the voice database.

The method of FIG. 3 also includes recording (340), by the recipient multilingual communications application (234), the synthesized speech (340) in the target language (330) in a digital media file (342). Examples of digital media files include MPEG 3 ('.MP3') files, MPEG 4 ('.mp4') files, Advanced Audio Coding ('AAC') compressed files, Advances Streaming Format ('ASF') Files, WAV files, and many others as will occur to those of skill in the art. Recording (330) the synthesized speech (326) in the target language (320) in a digital media file (332) typically includes storing the synthesized speech a media file that is supported by a digital audio player upon which enterprise data is to be rendered.

The method of FIG. 3 also includes playing (352) the media file (342) thereby rendering the synthesized speech (340). Playing the media file may be carried out by playing the media file directly from a digital media player application such as the digital media player application of FIG. 2. Alternatively, playing the media file may be carried out by storing (344) the media file (342) on a digital audio player (108) and playing (346) the media file (342) on the digital audio player (108) thereby rendering the synthesized speech (338) in the target language (330). Storing (344) the media file (342) on a digital audio player (108) may be carried out by copying the media file onto the digital audio player.

The method of FIG. 3 also includes recording (348) a speech response message in the target language (330). In the method of FIG. 3 the recorded speech response may include the recipient's (116) speech recorded on a digital audio recorder (114) in a manner similar to the recording of the speech message (304) by the sender (110).

The method of FIG. 3 also includes transmitting, from the recipient multilingual communications application (234) to a sender multilingual communications application (232), the speech response message in the target language. The speech response message in the target language may then be translated by the multilingual communications application (232) on the sender's computer (106) according to the method of FIG. 3. Alternatively, the speech response may be converted to text, translated to the source language, and synthesized speech may be created from the translated text in the source language using the multilingual communications application (234) on the recipients personal computer. In such cases, a digital media file containing the synthesized speech of the response in the target language may be sent to the sender (110) for rendering in the source language.

As mentioned above, translating (322) the text (316) in the source language (318) to translated text (328) in the target language (330) according to the method of FIG. 3 may include prompting (324) a user to select a target language. For further explanation, FIG. 4 sets forth a block diagram of a graphical user interface ('GUI') selection screen (802) that may be used to prompt a user to select a target language and receive from the user a selection of the target language useful in multilingual communications according to embodiments of the present invention. The GUI selection screen (802) of FIG. 4 includes a window (804) that includes an identification of a received new speech message in a source language that is not a predefined target language for rendering the speech message.

Figure 4:
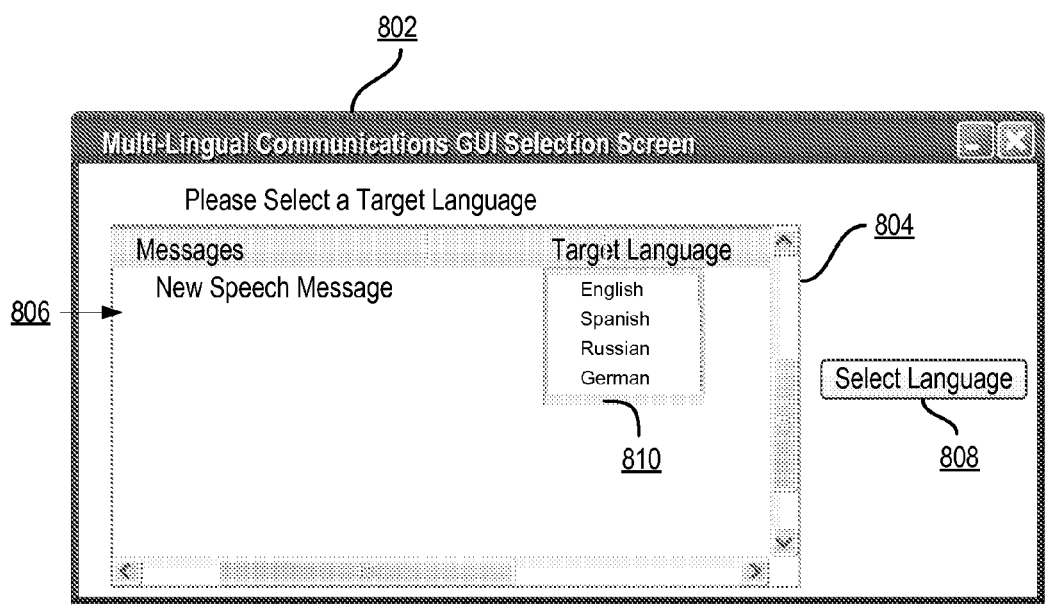
FIG. 4 sets forth a block diagram of a graphical user interface ('GUI') selection screen that may be used to prompt a user to select a target language and receive from the user a selection of the target language useful in multilingual communications according to embodiments of the present invention.

The GUI selection screen (802) of FIG. 4 also includes pull-down menu (810) that includes a list of identifications of target languages available as the target language for translation of the new speech message (806). The pull down menu of (810) includes the identifications of English, Spanish, Russian and German as available target languages available for translation. In the example of FIG. 4, a user is empowered through the pull-down menu to highlight a selection of a target language and select the highlighted target language by invoking the GUI button (808) labeled 'Select Language.'

Example embodiments of the present invention are described largely in the context of a fully functional computer system for multilingual asynchronous communications using messages recorded on handheld devices. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the example embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for multilingual asynchronous communications, the method comprising:
   receiving, by a recipient multilingual communications application of a recipient computing device, from a sender multilingual communications application of a sender computing device, a first speech message recorded in a first digital media file, wherein the first speech message is received via the sender multilingual communications application from a first user;
   converting, by the recipient multilingual communications application, the first speech message to a text representation of the first speech message;
   identifying, by the recipient multilingual communications application, that the text representation of the first speech message is in a source language that is not a predetermined target language;
   translating, by the recipient multilingual communications application in the recipient computing device of a second user, the text representation of the first speech message in the source language to a translated text representation of the first speech message in the target language, wherein the recipient multilingual communications application in the recipient computing device of the second user translates the text representation of the first speech message to the translated text representation of the first speech message in the target language based on the received first digital media file;
   converting, by the recipient multilingual communications application, the translated text representation of the first speech message to synthesized speech in the target language;
   recording, by the recipient multilingual communications application, the synthesized speech in the target language in a second digital media file;
   playing the second digital media file thereby rendering the synthesized speech to the second user;
   receiving, by the recipient multilingual communications application, from the second user, a second speech message in the target language comprising a response to the synthesized speech; and
   transmitting the second speech message to the sender multilingual communications application.

2. The method of claim 1, wherein playing the second digital media file further comprises:
   storing the second digital media file on a digital audio player; and playing the second digital media file on the digital audio player thereby rendering the synthesized speech in the target language.

3. The method of claim 1, further comprising:
recording the second speech message in the target language.

4. The method of claim 1 wherein the first speech message includes a user's speech recorded on a digital audio recorder.

5. The method of claim 1 wherein translating the text in the source language to translated text in the target language further comprises prompting a user to select a target language.

6. The method of claim 1 wherein translating the text in the source language to translated text in the target language further comprises translating the text in the source language to translated text in a default target language.

7. The method of claim 1, wherein transmitting the second speech message to the sender multilingual communications application comprises transmitting to the sender multilingual communications application a third digital media file, the method further comprising:
converting, by the recipient multilingual communications application, the second speech message in the target language to second text;
translating, by the recipient multilingual communications application, the second text to second translated text in the source language;
converting, by the recipient multilingual communications application, the translated second text to synthesized second speech in the source language; and
recording, by the recipient multilingual communications application, the synthesized second speech in the third digital media file.

8. A system for multilingual asynchronous communications, the system comprising a computer processor, a computer memory operatively coupled to the computer processor, the computer memory having disposed thereon computer program instructions capable of:
receiving, by a recipient multilingual communications application of a recipient computing device, from a sender multilingual communications application of a sender computing device, a first speech message recorded in a first digital media file, wherein the first speech message is received via the sender multilingual communications application from a first user;
converting, by the recipient multilingual communications application, the first speech message to a text representation of the first speech message;
identifying, by the recipient multilingual communications application, that the text representation of the first speech message is in a source language that is not a predetermined target language;
translating, by the recipient multilingual communications application in the recipient computing device of a second user, the text representation of the first speech message in the source language to a translated text representation of the first speech message in the target language, wherein the recipient multilingual communications application in the recipient computing device of the second user translates the text representation of the first speech message to the translated text representation of the first speech message in the target language based on the received first digital media file;
converting, by the recipient multilingual communications application, the translated text representation of the first speech message to synthesized speech in the target language;
recording, by the recipient multilingual communications application, the synthesized speech in the target language in a second digital media file;
playing the second digital media file thereby rendering the synthesized speech to the second user;
receiving, by the recipient multilingual communications application, from the second user, a second speech message in the target language comprising a response to the synthesized speech; and
transmitting the second speech message to the sender multilingual communications application.

9. The system of claim 8, wherein computer program instructions capable of playing the second digital media file further comprise computer program instructions capable of:
storing the second digital media file on a digital audio player; and
playing the second digital media file on the digital audio player thereby rendering the synthesized speech in the target language.

10. The system of claim 8, wherein the computer memory has further disposed thereon computer program instructions capable of:
recording the second speech message in the target language.

11. The system of claim 8, wherein the first speech message includes a user's speech recorded on a digital audio recorder.

12. The system of claim 8, wherein computer program instructions capable of translating the text in the source language to translated text in the target language further comprise computer program instructions capable of prompting a user to select a target language.

13. The system of claim 8, wherein computer program instructions capable of translating the text in the source language to translated text in the target language further comprise computer program instructions capable of translating the text in the source language to translated text in a default target language.

14. A computer-readable storage device having stored thereon computer-executable instructions that, when executed by at least one processor, perform a method of multilingual asynchronous communications, the method comprising:
receiving, by a recipient multilingual communications application of a recipient computing device, from a sender multilingual communications application of a sender computing device, a first speech message recorded in a first digital media file, wherein the first speech message is received via the sender multilingual communications application from a first user;
converting, by the recipient multilingual communications application, the first speech message to a text representation of the first speech message;
identifying, by the recipient multilingual communications application, that the text representation of the first speech message is in a source language that is not a predetermined target language;
translating, by the recipient multilingual communications application in the recipient computing device of a second user, the text representation of the first speech message in the source language to a translated text representation of the first speech message in the target language, wherein the recipient multilingual communications application in the recipient computing device of the second user translates the text representation of the first speech message to the translated text representation of the first speech message in the target language based on the received first digital media file;

converting, by the recipient multilingual communications application, the translated text representation of the first speech message to synthesized speech in the target language;

recording, by the recipient multilingual communications application, the synthesized speech in the target language in a second digital media file;

playing the second digital media file thereby rendering the synthesized speech to the second user, receiving, by the recipient multilingual communications application, from the second user, a second speech message in the target language comprising a response to the synthesized speech; and transmitting the second speech message to the sender multilingual communications application.

15. The computer-readable storage device of claim 14, wherein the method further comprises:

storing the second digital media file on a digital audio player; and playing the second digital media file on the digital audio player thereby rendering the synthesized speech in the target language.

16. The computer-readable storage device of claim 14, wherein the method further comprises:

recording the second speech response message in the target language.

17. The computer-readable storage device of claim 14, wherein the first speech message includes a user's speech recorded on a digital audio recorder.

18. The computer-readable storage device of claim 14, wherein translating the text in the source language to translated text in the target language comprises prompting a user to select a target language.

19. The computer-readable storage device of claim 14, wherein translating the text in the source language to translated text in the target language comprises translating the text in the source language to translated text in a default target language.

20. The computer-readable storage device of claim 14, wherein the computer readable medium comprises a recordable medium.

* * * * *